(12) United States Patent
Crain

(10) Patent No.: US 11,406,082 B2
(45) Date of Patent: Aug. 9, 2022

(54) PASTURING SYSTEM

(71) Applicant: Douglas Hiller Crain, Temescula, CA (US)

(72) Inventor: Douglas Hiller Crain, Temescula, CA (US)

( * ) Notice: Subject to any disclaimer, the term of this patent is extended or adjusted under 35 U.S.C. 154(b) by 26 days.

(21) Appl. No.: 16/563,823

(22) Filed: Sep. 7, 2019

(65) Prior Publication Data

US 2021/0029960 A1 Feb. 4, 2021

Related U.S. Application Data

(60) Provisional application No. 62/881,944, filed on Aug. 2, 2019.

(51) Int. Cl.
| | | |
|---|---|---|
| *A01K 31/18* | (2006.01) | |
| *A01K 39/00* | (2006.01) | |
| *A01K 39/01* | (2006.01) | |
| *A01K 1/00* | (2006.01) | |

(52) U.S. Cl.
CPC ............ *A01K 1/0035* (2013.01); *A01K 31/18* (2013.01)

(58) Field of Classification Search
CPC .... A01K 31/002; A01K 31/005; A01K 31/18; A01K 39/00; A01K 39/01; A01K 39/012; A01K 39/04; A01K 5/00; A01K 5/001; A01K 5/002; A01K 5/005; A01K 5/007; A01K 5/02; A01K 5/0208
See application file for complete search history.

(56) References Cited

U.S. PATENT DOCUMENTS

| | | | |
|---|---|---|---|
| 1,109,477 A | 9/1914 | Spanke | |
| 1,740,277 A | 5/1928 | Szilagyi | |
| 2,474,932 A | 7/1949 | Clark | |
| 3,302,616 A | 2/1967 | Bradshaw | |
| 3,343,521 A | 9/1967 | Moores | |
| 3,498,267 A * | 3/1970 | Leeming ............... | A01K 39/01 119/61.2 |
| 3,882,825 A | 5/1975 | McFadden | |
| 4,048,959 A | 9/1977 | Steele | |
| 4,341,181 A | 7/1982 | Fair | |
| 4,721,061 A | 1/1988 | McNatt | |
| 4,811,675 A * | 3/1989 | Segalla ................. | A01K 39/01 119/57.6 |
| 4,924,813 A | 5/1990 | Bixier | |
| 5,572,954 A | 11/1996 | Elkins | |
| 6,062,165 A | 5/2000 | Sieling | |
| 8,397,669 B2 | 3/2013 | DeVilliers | |
| D719,704 S | 12/2014 | Lee | |
| 9,622,453 B2 | 4/2017 | Wilson | |
| 9,844,204 B2 | 12/2017 | Schwartz | |
| 9,865,176 B2 | 1/2018 | Tran | |
| 10,085,438 B1 | 10/2018 | Dismang | |
| 2009/0223454 A1 | 9/2009 | Van den Berg | |
| 2013/0269625 A1 | 10/2013 | Van Den Berg | |
| 2015/0123060 A1 | 5/2015 | Gross | |
| 2015/0250136 A1* | 9/2015 | Wilson ................... | A01K 3/00 119/452 |
| 2019/0110430 A1 | 4/2019 | Badiou | |
| 2019/0235087 A1 | 8/2019 | Greive | |
| 2019/0230899 A1 | 9/2019 | Greive | |

* cited by examiner

*Primary Examiner* — Daniel J Colilla
(74) *Attorney, Agent, or Firm* — Vadim Gordin

(57) ABSTRACT

Systems are disclosed for pasturing livestock on an industrial scale, including for instance poultry.

10 Claims, 15 Drawing Sheets

US 11,406,082 B2

PASTURING SYSTEM

PRIORITY CLAIM

This application claims priority to provisional application No. 62/881,944 filed on Aug. 2, 2019 which is hereby incorporated by reference in its entirety.

BACKGROUND/FIELD

The invention relates to space efficient free-range pasturing for small livestock, including but not limited to poultry.

In the field of free-range poultry farming, it is often labor intensive to provide a changing pasture space to a large group of animals. Systems are provided for largely automating the process of pasturing small livestock including but not limited to poultry.

SUMMARY

Systems and methods for pasturing poultry are disclosed herein.

According to certain embodiments of the present disclosure, a system for pasturing animals includes; an elongated coop having connected vertical walls and a roof as well as an open floor therebelow with the coop being moveable in a first direction upon wheels or skids; a silo for collecting grain or feed; and an elongated conveyor or auger extending in a direction parallel to the first direction, with the conveyor or auger providing a path for grain or feed from the silo to an internal feed distribution system within the coop as the coop travels in the first direction.

According to further embodiments of the present disclosure, a pasturing system further includes a moveable fence coupled to the coop and moving therewith which defines an adjacent cattle grazing area.

According to further embodiments of the present disclosure, the conveyor or auger is operatively supported upon wheels or skids and is therefore movable.

According to further embodiments of the present disclosure, the conveyor or auger rotates about a central point on a field.

According to further embodiments of the present disclosure, the conveyor or augur travels in a linear direction generally parallel to the movement of the coop.

According to further embodiments of the present disclosure, the conveyor or auger also provides fluid connectivity for delivering water to the internal systems of the coop.

According to further embodiments of the present disclosure, a pasturing system further includes at least one of the walls of the coop having compliant segments along one of its walls which accommodates irregularities in the elevation of the ground upon which the coop travels.

BRIEF DESCRIPTION OF THE FIGURES

In the figures, which are not necessarily drawn to scale, like numerals describe substantially similar components throughout the several views. The drawings illustrate generally, by way of example, but not by way of limitation, various embodiments discussed in the claims of the present document.

DETAILED DESCRIPTION OF THE FIGURES

Figure 1:
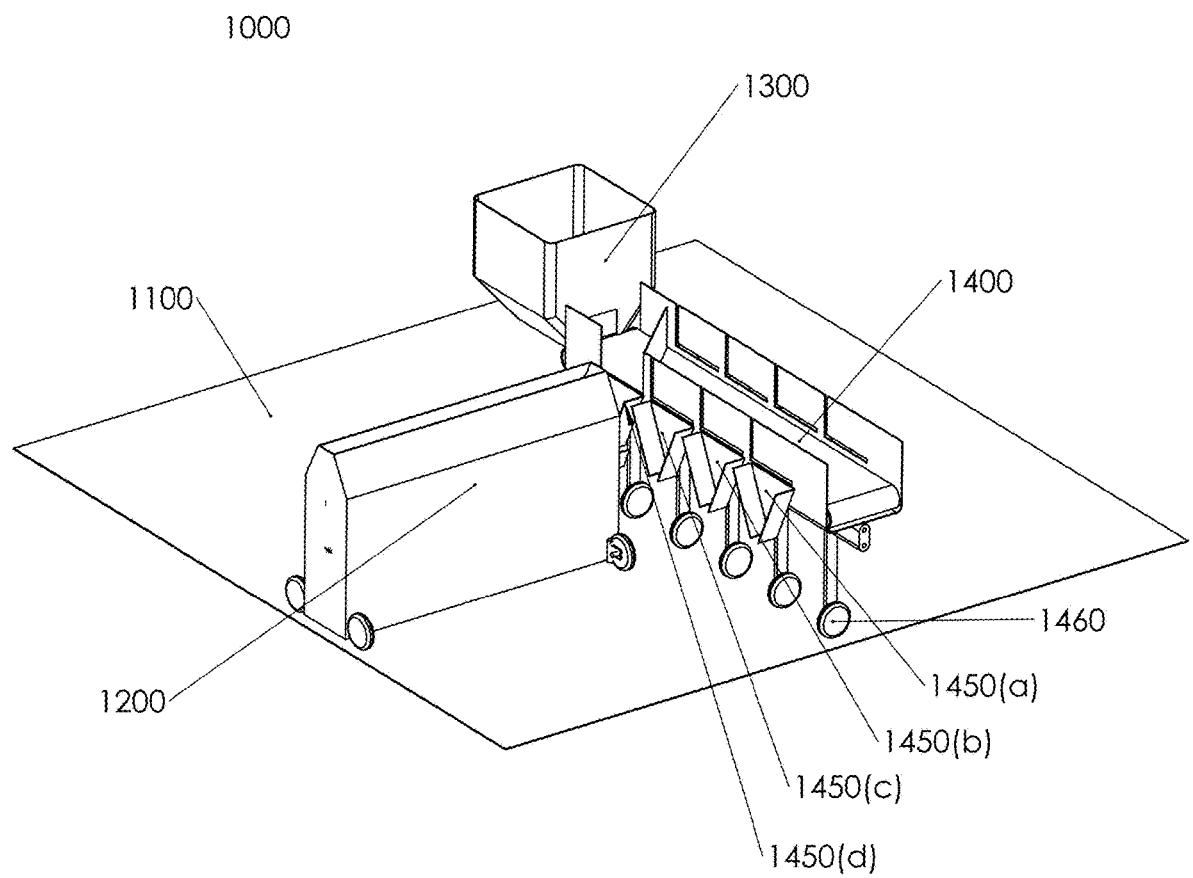
FIG. 1 shows a perspective view of a pasturing system.

Various non-limiting embodiments of the present disclosure will now be described to provide an overall understanding of the principles of the structure, function, and use of the proficiency tracking systems and processes disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics may be combined in any suitable manner in one or more embodiments.

Described herein are example embodiments of systems and methods for pasturing chickens or other livestock.

The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Specific sizes and scales are here provided solely as non-limiting examples of implementation(s) of the present invention. The substance of the present invention is an arrangement of functional elements as described in the claims that make it easier to pasture-raise chickens and other small livestock than with any systems described in the prior art. Upon reading the present disclosure, one having ordinary skill in the art will understand that the said pasturing systems may be scaled down to (for instance) a quarter acre backyard chicken pasturing system all the way up to a several hundred acre industrial chicken pasturing system while remaining within the scope of the appended claims.

The present invention has been described in connection with the use of conveyor belts and augurs to move feed or grain. These are intended as non-limiting embodiments and that one having ordinary skill in the art should understand that there are other technologies known in the materials handling arts that can be implemented in place of augers or conveyors while remaining substantially equivalent for the purposes of interpreting the present claim. These include for instance bins moving along a conveyor, gravity driven shoots, and other material handling technologies known in the arts.

Referring now to FIG. 1, a pasturing system 1000 includes a pasturing area 1100 comprised of vegetation upon which it is desirable to have livestock roam or graze, a moveable coop 1200, a central silo 1300 sized and shaped for receiving grain or feed therewithin, a center pivot arm 1400.

Center pivot arm 1400 has a plurality of feed shoots 1450(*a-d*) disposed thereupon and rests upon a plurality of wheels 1460.

Figure 3:
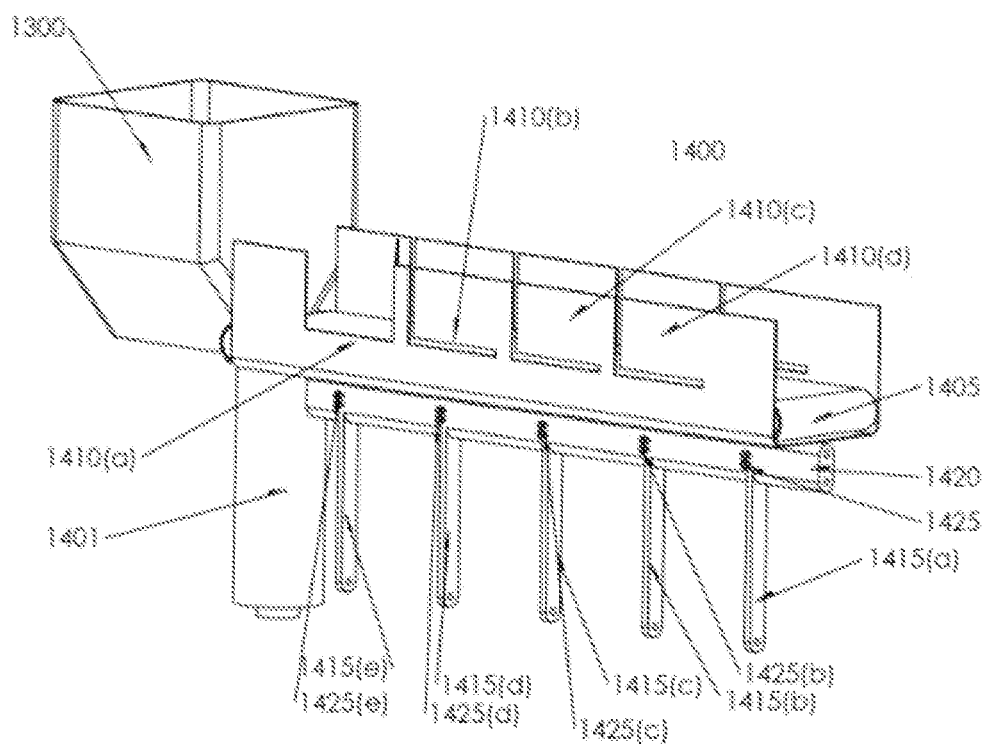
FIG. 3 shows a perspective view of a pasturing center pivot.

Referring now to FIG. 3, center pivot arm has a conveyor 1405 that draws feed or grain from a silo 1300. The feed or grain is then diverted by at least one of a plurality of pneumatically or electrically driven doors 1410(*a-d*) into the previously described feed shoots 1450(*a-d*). There is a water and electricity supply line 1420 coupled to the arm for providing a coop with water and electricity via a plurality of outlets 1425(*a-d*). There are legs 1415(*a-d*) providing operative support from the arm to the ground therebelow. According to certain embodiments of the present disclosure, as shown in the figures, there are wheels coupled to the bottom of the legs 1415(*a-d*) to facilitate rotation about a central post 1401. According to other embodiments of the present disclosure, the legs are permanently placed upon the ground.

Figure 4:
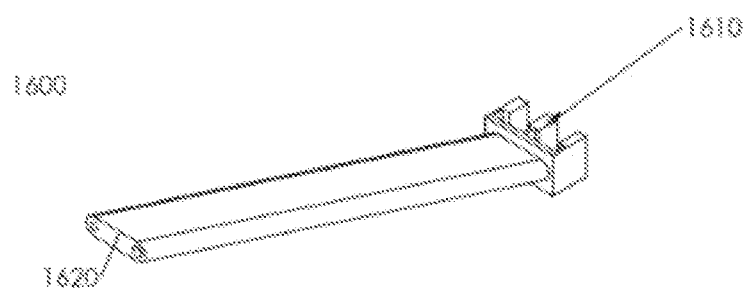
FIG. 4 shows a perspective view of a supply umbilical.

Referring now to FIG. 4, an umbilical 1600 is shown, having a proximal coupler 1610 at a first end thereof, sized and shaped to provide electrical and fluid communication with at least one of outlets 1425(*a-d*) with the first end of the umbilical configured to slide along the length of the center pivot. The umbilical provides an elongated channel for carrying said water and electricity to terminals 1620 at a second end thereof for delivery into a coop.

Figure 5:
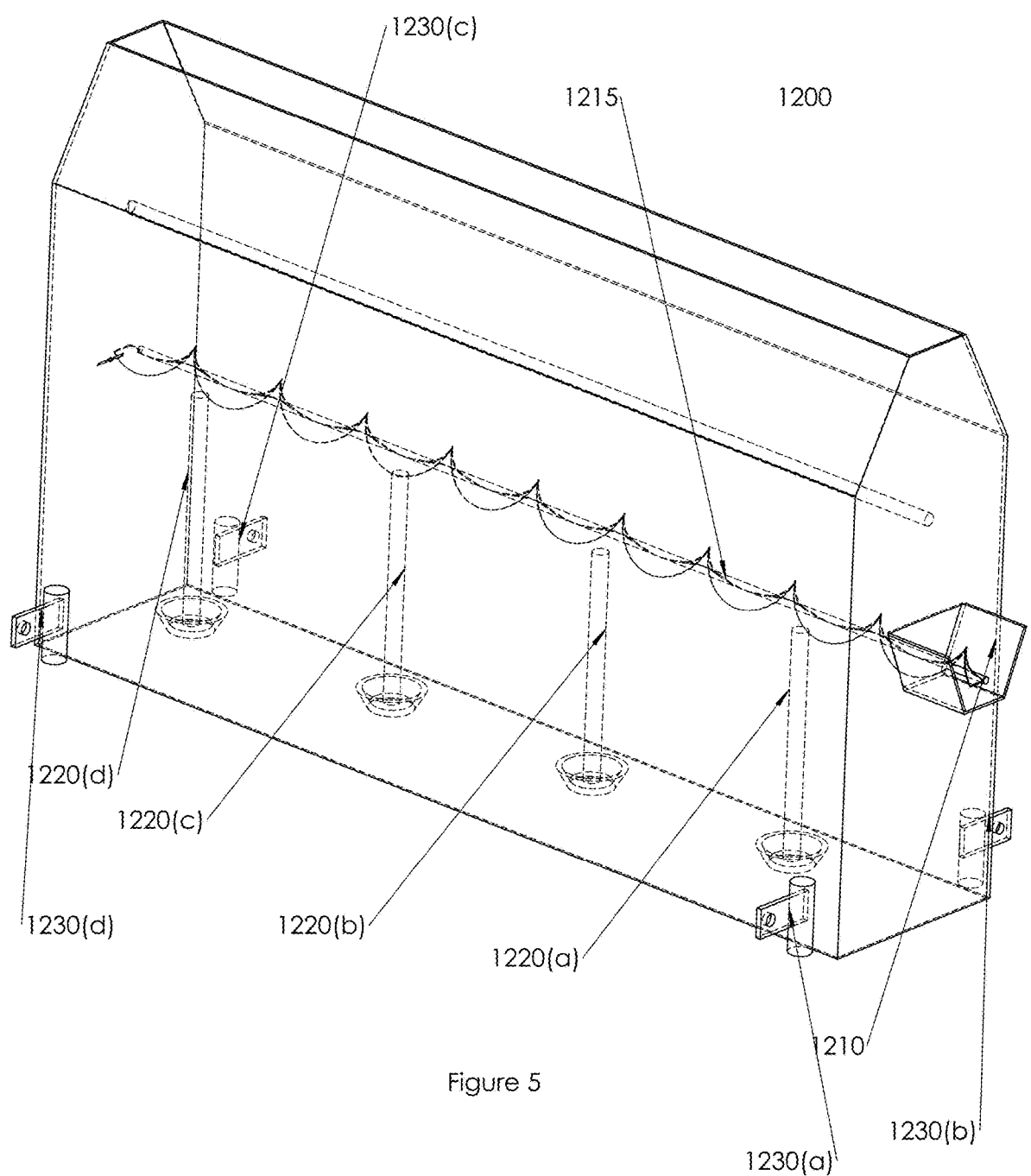
FIG. 5 shows a wireframe perspective view of a coop.

Referring now to FIG. 5, a coop 1200 is a generally rigid structure having an open floor exposed to the ground therebelow to allow any animals therewithin to graze on the ground below the coop. Coop 1200 shown having a receiver 1210 for catching feed therewithin and an auger 1215 running a substantial portion of the length of the coop, with the auger being operatively configured for delivering feed to a plurality of bell-shaped feeders 1220(*a-d*) as known in the agricultural arts. There are a plurality of wheel pivots 1230(*a-d*) sized and shaped to receive wheels therewithin such that the coop can be moved over terrain. The wheels may be either driven, including for instance by electric or hydraulic motors, or they may be passive, with the coop being designed to be pulled along terrain by a secondary vehicle, including for instance a tractor.

Coops as described in the present disclosure have an internal feed distribution system. This may be driven by an auger 1215 and feed bells 1220, as simple as a feed tough, or other system known in the arts for distribution animal feed within a coop.

Figure 2:
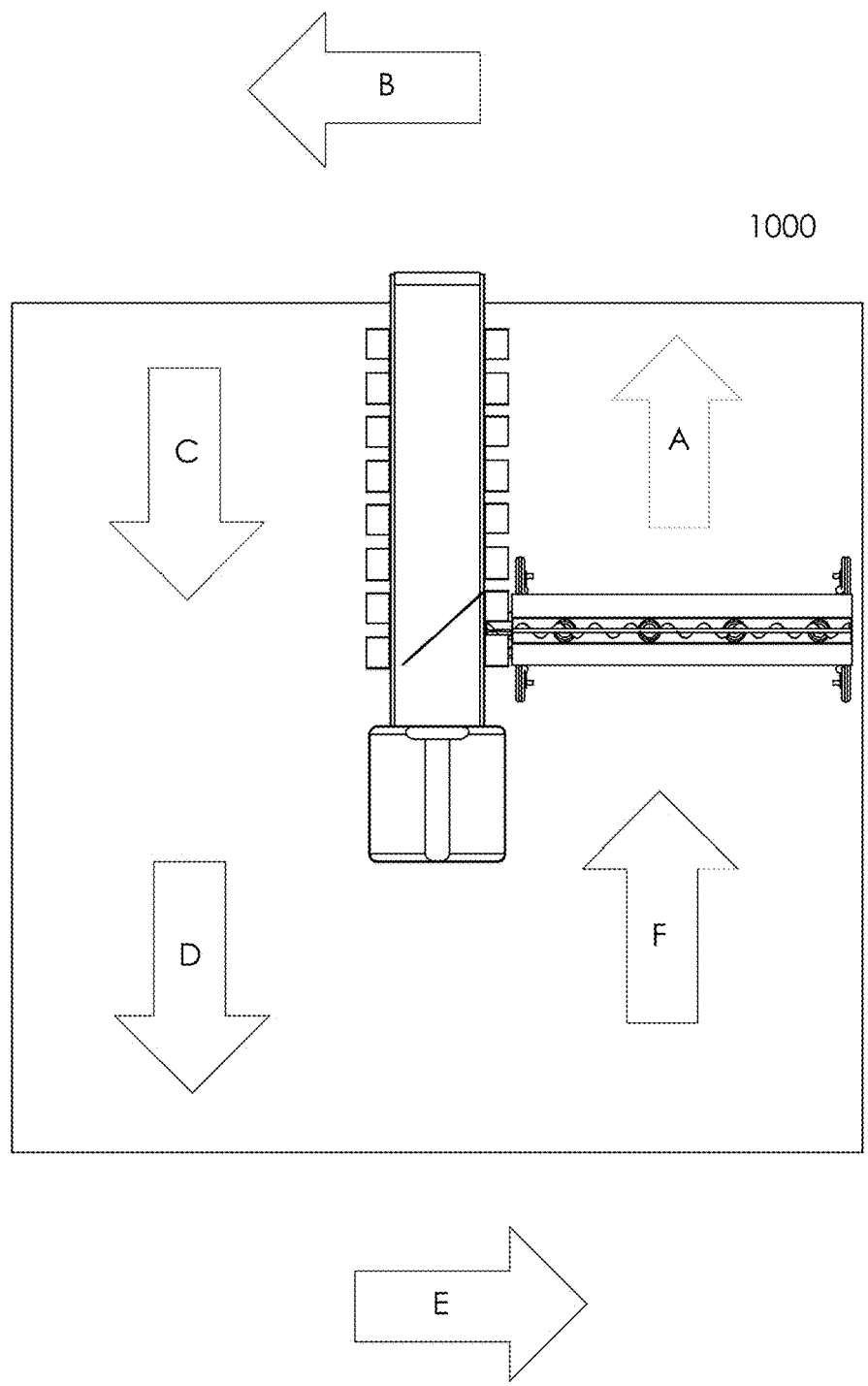
FIG. 2 shows a top view of a pasturing system.

Referring now to FIG. 2, a method of using the Pasturing System will now be described. Initially, the system is provided in a first condition as shown in FIG. 2, with the first gate 1410(*a*) open into the conveyor 1405, thereby diverting feed into the receiver 1210. Animals, including for instance young chickens are placed into the coop and allowed to graze upon the vegetation therebelow. Electricity and water is provided to the coop by means of the umbilical, which is engaged upon outlet 1425(*a*).

Once sufficient grazing has occurred, the coop is moved in direction A until it is located with the receiver 1210 disposed below gate 1410(*b*), with the umbilical coupled to outlet 1425(*d*). Gate 1410(*a*) is closed and gate 1410(*b*) is opened, thereby providing the chickens with fresh terrain upon which to graze as well as feed, electricity, and water for the coop. This process is repeated until the coop reaches the top of the pasture. At this point, it moves up, above the reach of the center pivot 1400 and along the path B shown in the figure. It is then moved down along path C as shown, along the opposing side of the center pivot 1400, with the coop stopping as needed for the chickens to graze a the respective locations along the pivot.

When the coop reaches the end of path C, the umbilical is disengaged by a user, and the pivot swings clockwise 180 degrees, thereby allowing the coop to traverse paths D and F while still being supplied by feed, water, and electricity from the center pivot.

According to certain embodiments of the present disclosure, there is a second center pivot connected to the system, which provides irrigation to the pasture area not currently being grazed by the movable coop.

Figure 6:
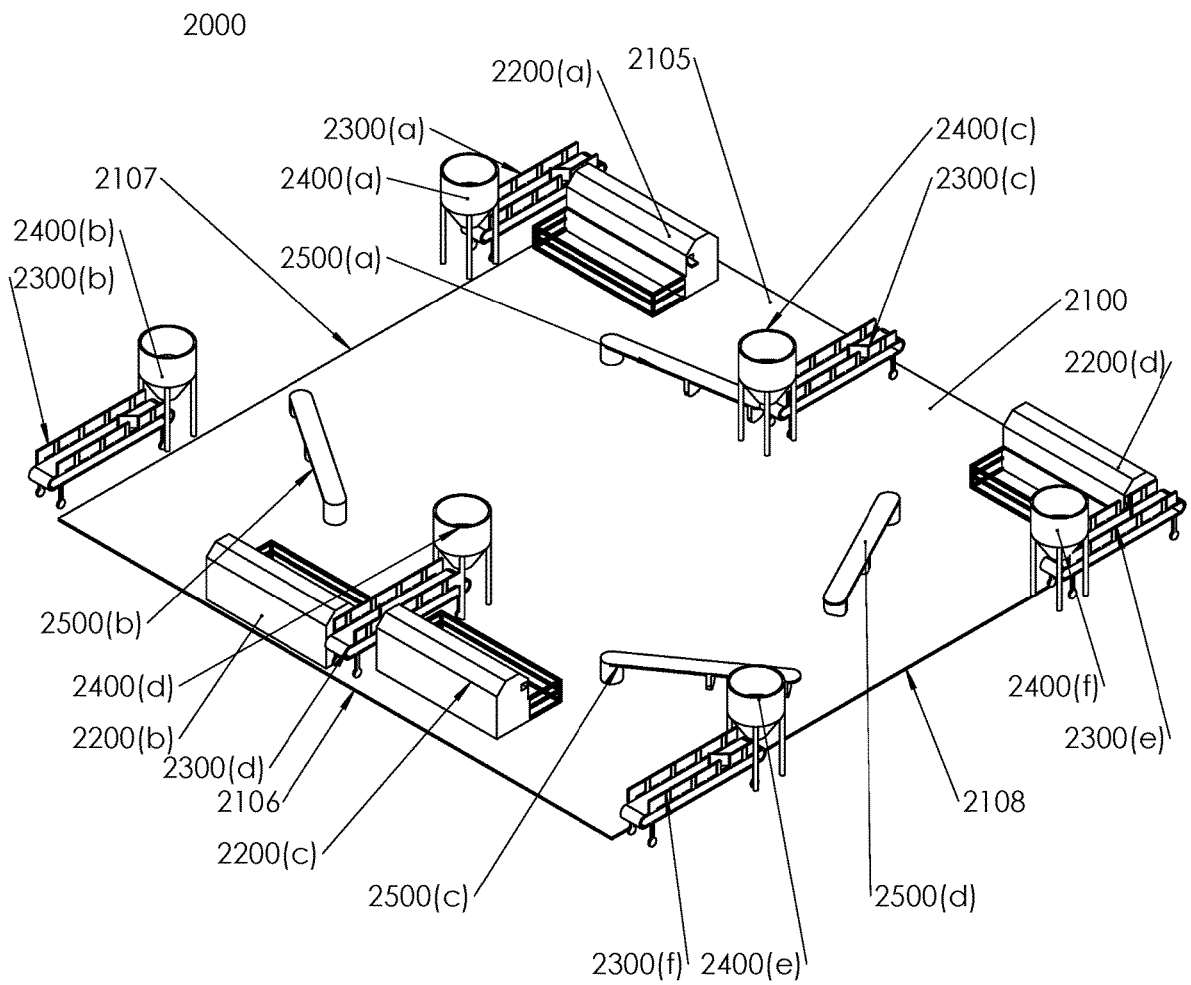
FIG. 6 shows a perspective view of a second embodiment of a pasturing system.

Referring now to FIG. 6, a pasturing system 2000 is shown, with the pasturing system being disposed upon a field 2100 having a first border 2105, a second border 2106, a third border 2107 and a fourth border 2108. There are a plurality of chicken coops 2200(*a-d*) disposed upon field 2100. There are conveyors 2300(*a-f*) disposed upon the field which supply the coops with feed, water, and electricity. There is in turn a plurality of grain silos 2400(*a-f*) that supply their respective conveyors with feed. There is also a plurality of center pivot irrigation arms 2500(*a-d*) which irrigates the field 2100.

Figure 8:
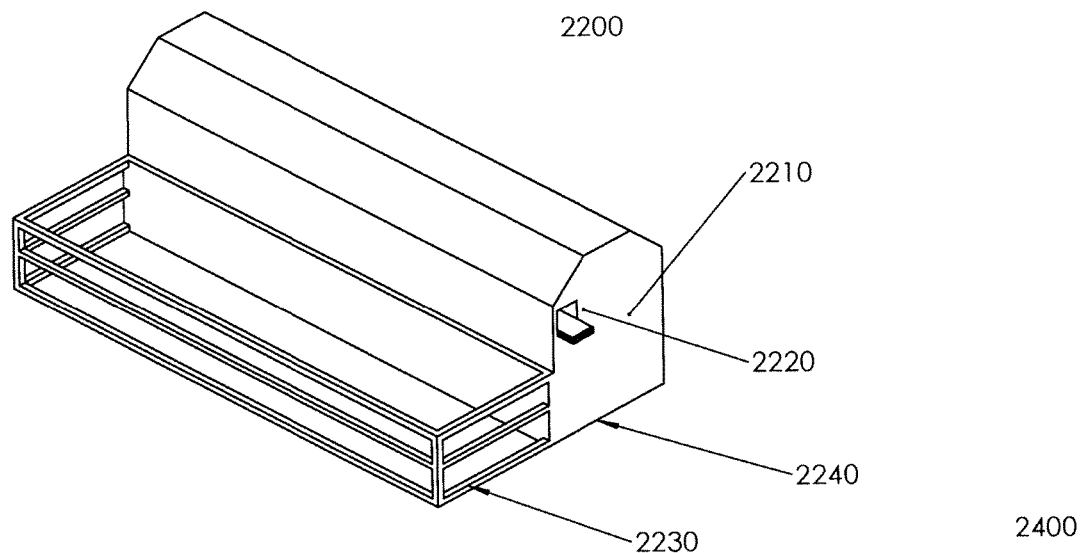
FIG. 8 shows a perspective view of a coop.

Referring now to FIG. 8, a coop 2200 includes a structure having walls, a roof, and a floor exposed to the earth therebelow. There is a grain conveyer 2220 extending outward from a face of the structure configured for carrying grain or feed into the structure and distributing it internally according to methods known in the design of chicken coops. The area covered by a roof is operatively configured with feed and water systems appropriate for raising chickens, thereby defining a Chicken Area. There is an electrified wire enclosure 2230 at a first end of the coop which is sized and shaped to enclose grazing cattle or other large mammals therein thereby defining a Cattle Area. The entire coop 2200 is configured to roll along a direction generally parallel to edge 2240 of the coop either under its own power or by being pulled by a tractor or other temporarily engaged source of locomotion. Examples of moveable animals enclosures and their necessary internal systems include for instance U.S. Pat. Nos. 4,048,959, 4,341,181, 8,490,327, and application number 2019/0110430 which are hereby incorporated by reference in their entirety.

Figure 9:
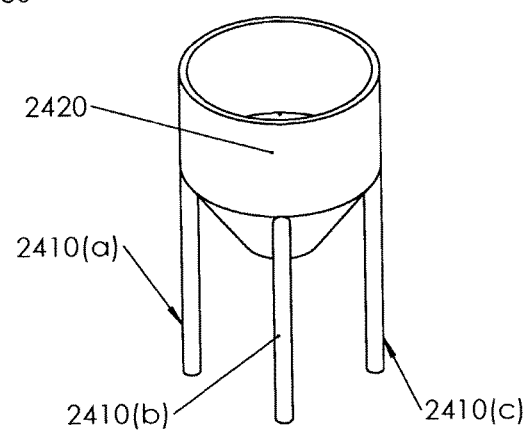
FIG. 9 shows a perspective view of a grain silo.

Referring now to FIG. 9, a grain silo 2400 is shown. Silo has 4 feet 2410(a-d) providing operative support against the ground therebelow for a grain holder 2420. Foot 2410(d) is obscured from view by leg 2410(b). Grain holder 2420 is a generally hollow member with an opening at its top end comprising a cylindrical portion atop a frustoconical portion. The bottom end of the frustoconical portion is operatively configured to controllably deposit grain from the interior of the grain holder to a conveyor 2300. The feet 2410(a-d) of each silo 2400 are spaced so that a conveyor 2300 can freely travel therebetween.

Figure 10:
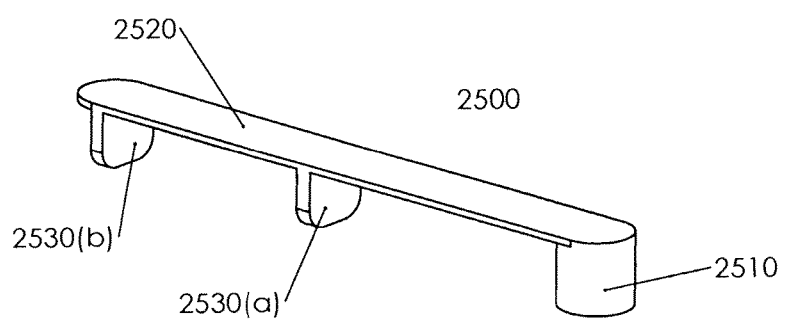
FIG. 10 shows a perspective view of a center pivot irrigation system.

Referring now to FIG. 10, a center pivot irrigator 2500 is shown. Irrigator 2500 is a schematic representation of a center pivot irrigation system which is well known in the agricultural arts. Irrigator 2500 has a pivot point 2510, which is configured to be rotably anchored into the ground and define a vertical axis about which the irrigator 2500 rotates. Pivot point 2510 is fluidly connected to an external line of water, often from a buried hose or pipe. There is a generally hollow arm 2520 extending outward normal from the pivot point 2510 and in fluid communication with the line of water, with the downward face of arm 2510 having a plurality of apertures disposed thereupon from which water can exit to soil and grass therebelow. There are a plurality of slides or wheels 2530(a and b) which roll or slide along the ground and provide operative support for the arm 2520.

Figure 11:
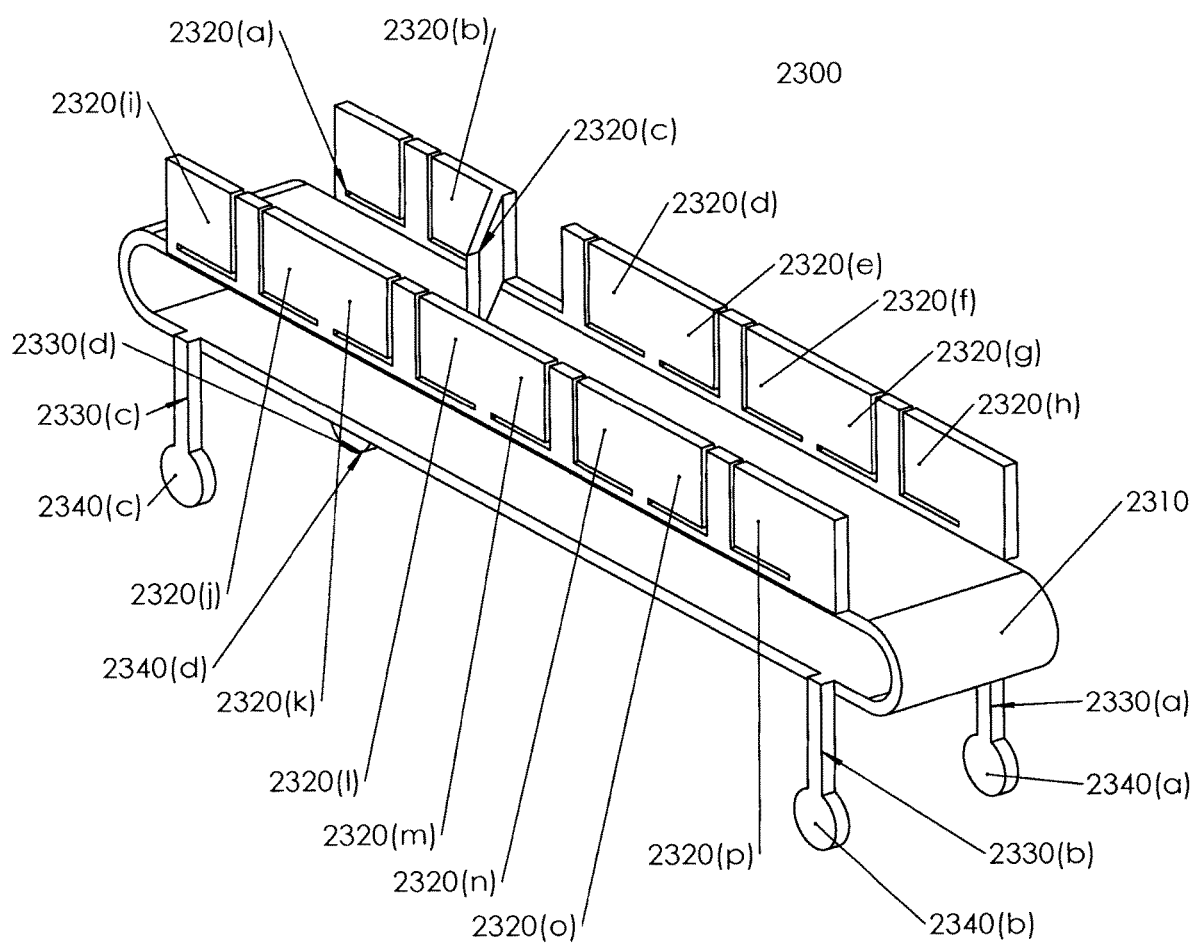
FIG. 11 shows perspective view of a conveyor.

Referring now to FIG. 11, a conveyor 2300 is shown, with the conveyor having a driven belt 2310 for carrying feed from silo 2400. There is a plurality of gates 2320(a-p) disposed upon walls on opposing sides of belt 2310, with the gates being electrically or pneumatically driven to divert grain or feed from the conveyor as will be later described. There is a plurality of legs 2330(a-d) which provide operative support for the assembly against the ground. Wheels 2330(a-d) terminate respectively upon wheels 2340(a-d). Wheels 2340(a-d) may be either driven by electrical or hydraulic means or alternatively passive, functioning purely as rollers and allowing the assembly to be moved by a tractor, truck, or other piece of farm machinery.

Figure 7:
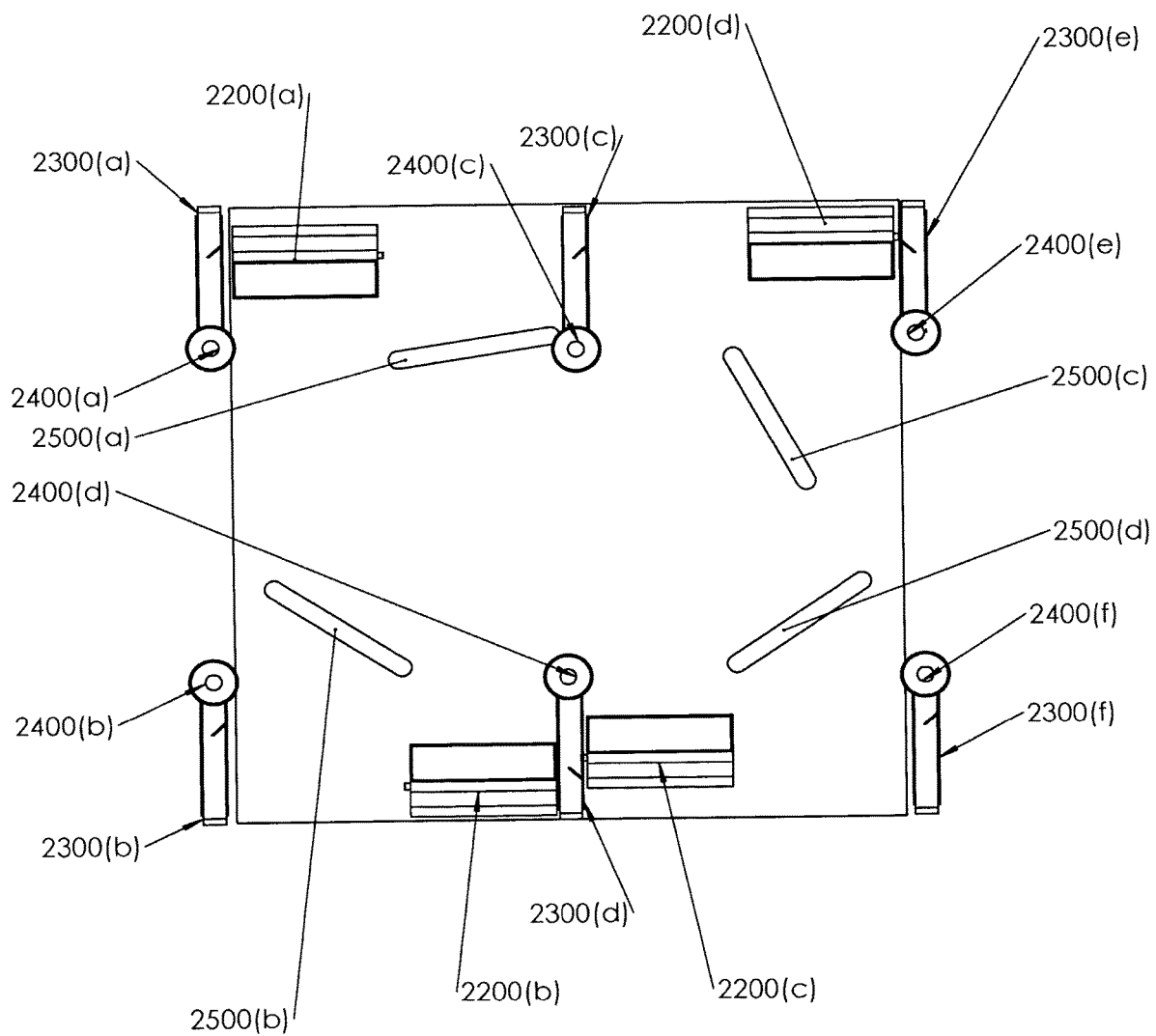
FIG. 7 shows a top view of the pasturing system of FIG. 6.

A method of using the present pasturing system 2000 will now be described. Referring to FIG. 7, a pasturing system 2000 is disposed upon a plot of land approximately 100 acres, with the enclosed Chicken Area of each coop having a footprint of approximately 30-40 feet wide by 600 feet long. To ready the system for operation, it is disposed upon a pasture having vegetation upon which chicken and cattle may graze, the Chicken Area(s) of each coop are populated with young chicks, the Cattle Areas of each coop are populated with cattle, and the Silos are each filled with grain. Each coop is in communication with a conveyor so that grain and water from one of the silos may be delivered to the coop.

Once loaded with birds, the coops begin traversing the field, with coops 2200(a) and 2200(d) moving southbound and coops 2200(b) and 2200(c) moving northbound. As each coop moves, the cattle in the Cattle Areas first feed on and trample the taller vegetation, making it shorter and more readily consumable for the chicks in the Chicken Areas. As each coop moves, the appropriate gates 2320(a-i) are opened by an operator or automatic system to keep in grain conveyor 2220 of each coop 2200(a-d) supplied with grain.

Figure 12:
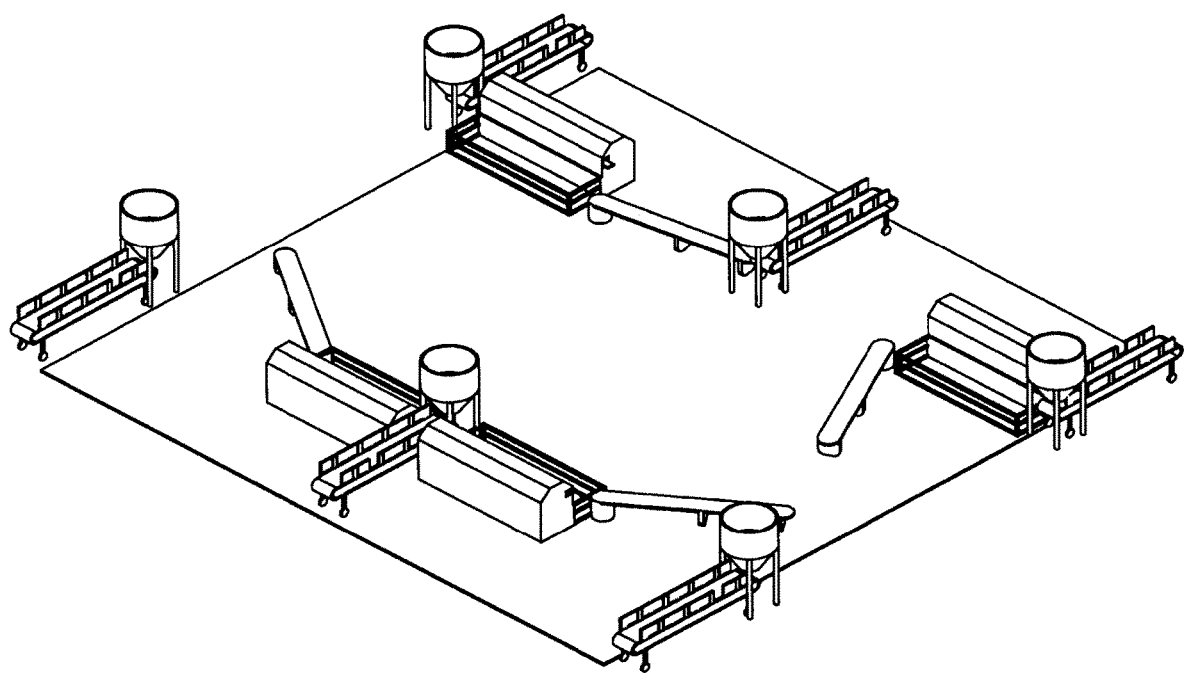
FIG. 12 shows a perspective view of a pasturing system.
Figure 13:
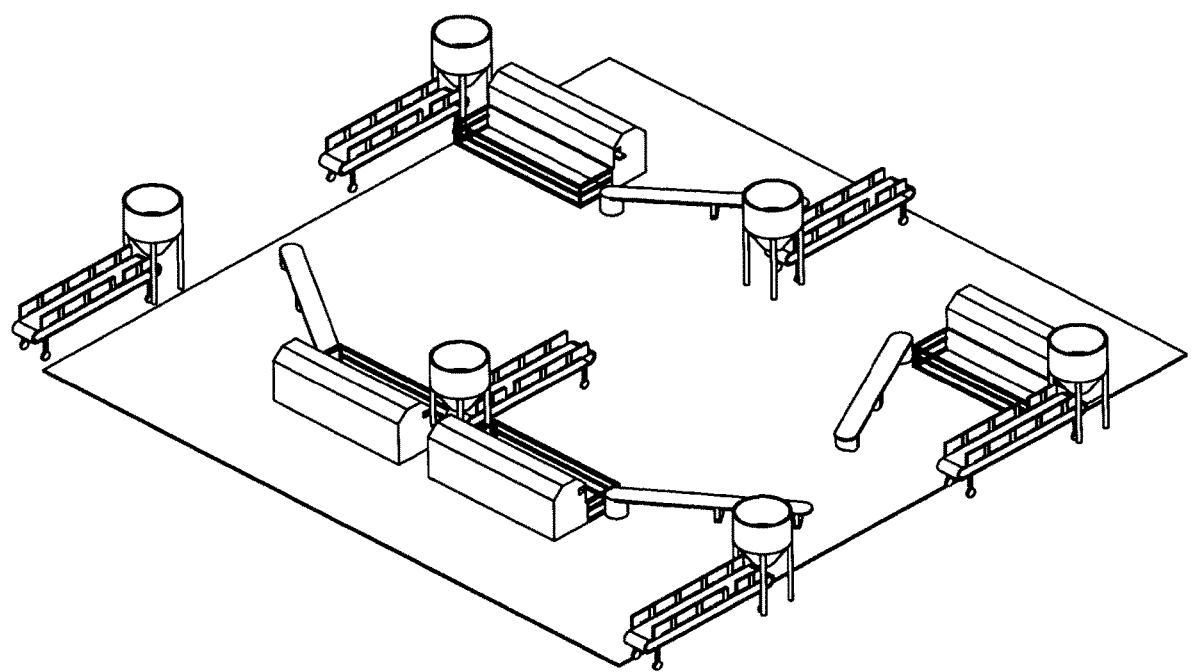
FIG. 13 shows a perspective view of a pasturing system.
Figure 14:
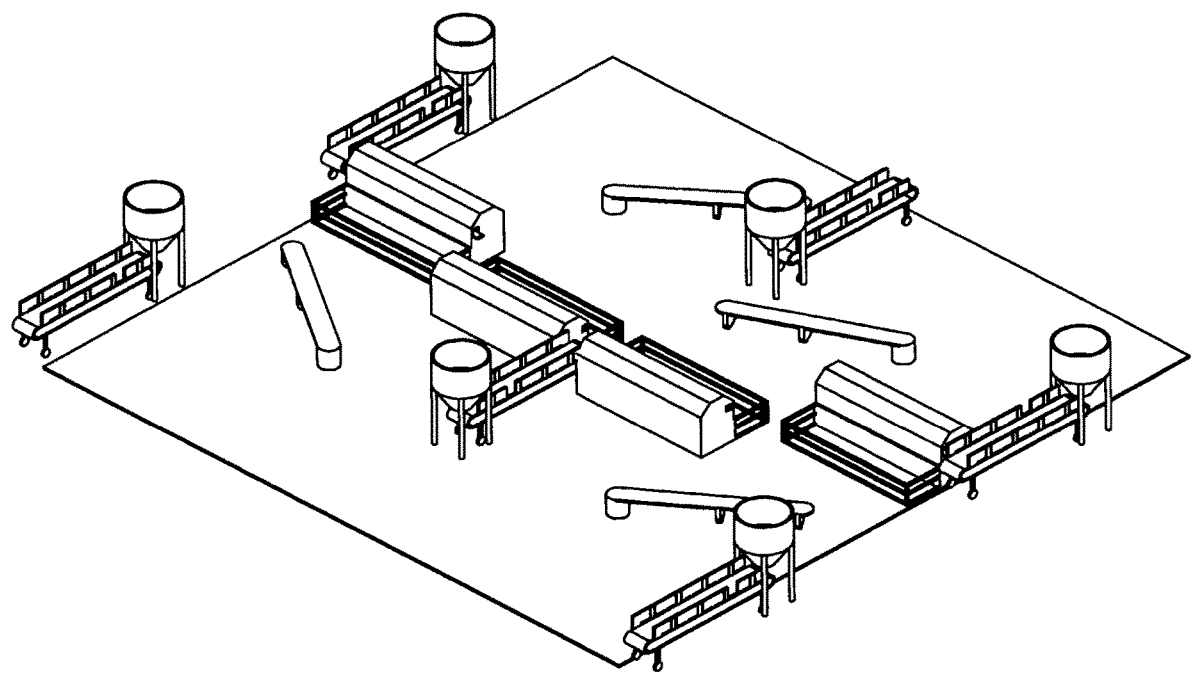
FIG. 14 shows a perspective view of a pasturing system.
Figure 15:
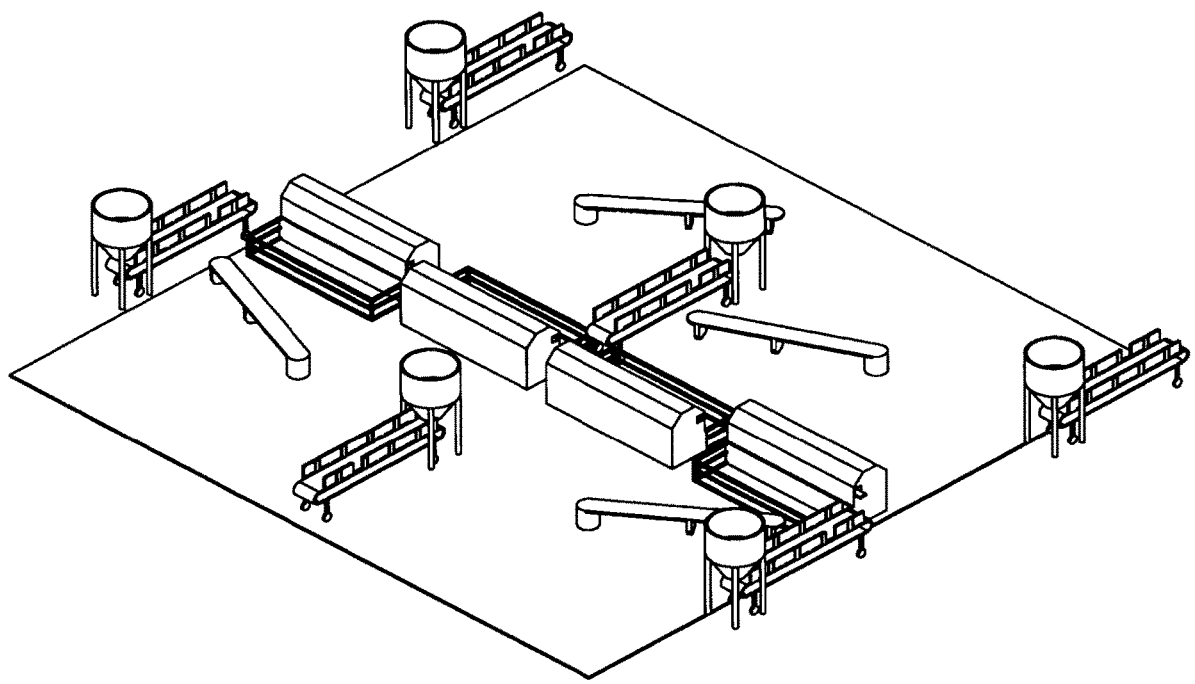
FIG. 15 shows a perspective view of a pasturing system.
Figure 16:
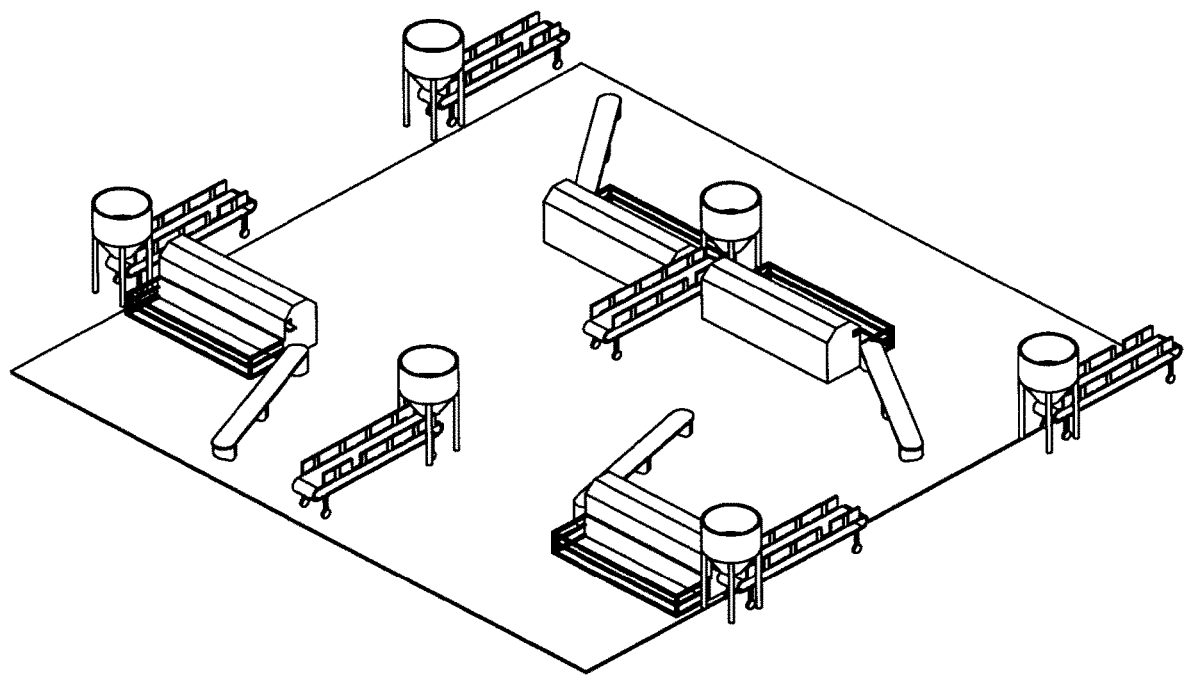
FIG. 16 shows a perspective view of a pasturing system.
Figure 17:
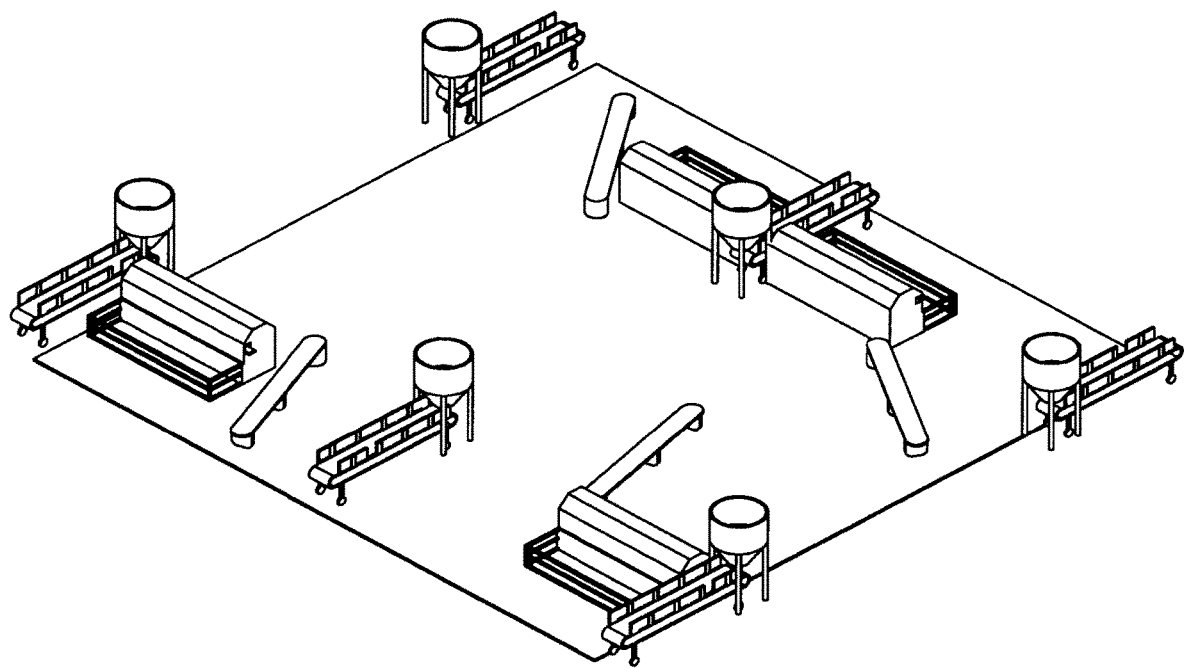
FIG. 17 shows a perspective view of a pasturing system.

When each coop has traversed a substantial portion of the length of its adjacent conveyor 2300 as shown in FIG. 12, the conveyor(s) 2300 are translated north/south with its silo remaining still into a second configuration as shown in FIG. 13. The second configuration, allows the coops to travel to the midline of the field, as shown in FIG. 14. Once they reach the midline, the conveyor(s) 2300 area translated into a third configuration as shown in FIG. 15, thereby allowing the coops to continue their path of travel. When the coops reach the end of their conveyor(s) 2300 as shown in FIG. 16, the conveyor(s) 2300 are again translated into the configuration shown in FIG. 17, thereby allowing the coops to finish their travel. At the completion of the path, the chickens are harvested from the coop and the system is reset into the configuration shown in FIGS. 6 and 7. During the duration of the travel path, the center pivot irrigators oscillate to provide water for the field therebelow.

Figure 18:
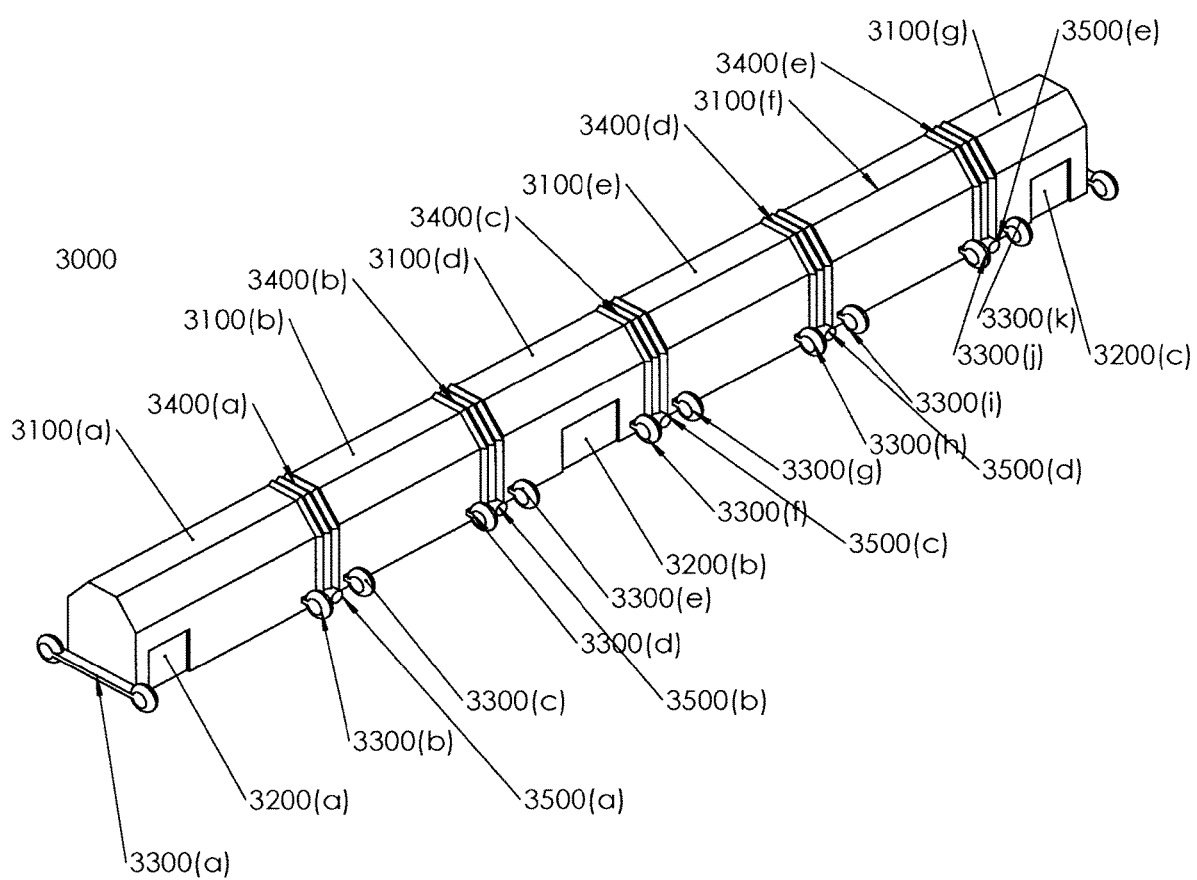
FIG. 18 shows a perspective view of a coop.

Referring now to FIG. 18, an elongated coop 3000 is shown having a plurality of rigid sections 3100(a-g) which are operatively supported by wheelsets 3300(a-k). Each wheelset may be either passive or active, meaning it is just a wheel on a pivot with the structure intended to be dragged by a tractor or other piece of farm machinery, or active, meaning that it is drive by an electric, gasoline, or hydraulic drive. Each rigid section of the coop is hingedly coupled to its adjacent section by means of pins 3500(a-e) which define an axis of rotation. As the structure rolls over imperfectly flat terrain and flexes about pins 3500(a-e), flexible accordion sections 3400(a-e) similar to those seen on articulating buses, including for instance the bus described in U.S. Pat. No. 4,482,165 which is hereby incorporated by reference in its entirety accommodate the change in geometry while applying minimal stress and stain to the rigid elements of the structure. There is a plurality of sliding doors 3200(a-c) that provide access to farmers seeking to inspect or harvest birds inside the coop.

According to further embodiments of the present disclosure, the pins 3500(a-e) are absent, with the structural connection between the rigid sections of the coop being provided solely by the accordion sections 3400(a-e), thereby allowing the segments to flex in additional directions.

In order to produce pastured poultry, or any other livestock, on mass scale, an open floored coop, or building will need to be of significant length. For certain embodiments of the present disclosure, the coop building could be hundreds of feet long. The drive mechanism on this coop, or building, will attempt to move the structure at an even speed, keeping the length of the building in the same plane. Moving a structure of this size in perfect unison is very difficult, considering the terrain and elevation changes on an open pasture. In many present implementations of moving coops, pastures need to be leveled before they can be used with a moving coop, which adds significant time and costs to the operations of a farm.

One approach disclosed in the present invention is the use of pivot points between the rigid and flexible sections of the coop to pivot in a forward and back direction (relative to the travel of the coop), as it navigates the terrain of the pasture. As the open floored coop moves along the pasture, the drive system on each wheel, will continuously re-calibrate the rate of speed to keep the length of the structure approximately straight and uniform. The joint, or pivot points on this open floored structure will need to accommodate the up and down movements created by traversing the irregular terrain, as well as the forward and back movement created by the drive system as it attempts to keep the structure uniform and in an approximately straight line. Without these pivot mechanisms, an open floored coop moving along pasture will be unable to travel any extended length of time without becoming structurally unsound.

An additional advantage to having an open floored coop or building designed in a plurality of rigid sections with complaint coupling therebetween, is that it eliminates the need to measure elevations and level a 100-200 foot plus structure's foundation. Leveling a structure this size is time consuming, difficult and expensive. Our model of smaller, (for example 30-60 foot) sections built one at a time, creates an easily manageable on-site build out method. Each 30-60 foot section can be quickly leveled and built allowing the construction crew to move quickly from one section to the next in an efficient manner. This design is a vast improvement over a building with wheels under every post. A system with wheels under every post of the structure will sustain much more stress as it moves along a pasture because of the close proximity of contact points between the foundation of the structure and the ground. The model described in the present embodiment directs flexion, or pivots, to the designated pivot points, allowing the structure to remain structurally sound as it travels along the pasture.

The systems described in this patent are designed to raise chickens on pasture in a mass scale. The system allows for automation of major processes and tasks as well as continuous contact points with all utilities and supplies, as it grazes a field with poultry or other livestock.

The rotational grazing method implemented with the present system also provides optimal manure control, as the open flooded coop will travel in a linear direction, or linear and lateral direction, around the supply line. Land can only absorb a limited amount of manure/nitrogen at a time. Rotational grazing allows for a rest period of approximately 90 days between manure delivery to the field.

The system(s) of a linear, open floored coop, rotating or traveling along or around a supply line accomplishes this in an optimal and ideal fashion. Additionally, utilizing the present linear coop(s) with the described supply line simplifies the engineering and on site build out. It combines the benefits of a rotating center pivot system with the functionality of the linear coop system.

Using a linear system in conjunction with our delivery method also allows the chickens to minimize their daily travel time. Chickens get stressed when they are over worked, especially in the heat. Our system, being linear, creates a shorter distance of travel for the chicken as compared to rotating, center pivot systems. As the chicken only has to move the width of the rectangular, open floored chicken coop each day.

In comparison, a "slice of pie" shaped coop (including for instance that of applications 2019/0230899 and 2019/0235087), rotating around a center pivot, has different rates of travel from the inner point of the "slice of pie" shaped coop, to the outside edge of the chicken coop. These varying rates of travel create problems for the chickens. Consider also the magnified effects of this on smaller, younger birds.

The present system(s) solve this problem with even, moderate rates of daily travel. Our system also distributes the manure evenly as well.

According to certain embodiments of the present disclosure, the elements of the present system are arranged such that a center pivot irrigator such as 2530 is tall enough, and specifically the struts or legs upon which it rests are tall enough to allow a conveyor to travel therebelow when the irrigator is an approximately right angle to the conveyor.

Unless otherwise indicated, all numbers expressing quantities of components, conditions, and otherwise used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

It is understood that, in light of a reading of the foregoing description, those with ordinary skill in the art will be able to make changes and modifications to the present invention without departing from the spirit or scope of the invention, as defined herein. For example, those skilled in the art may substitute materials supplied by different manufacturers than specified herein without altering the scope of the present invention.

What is claimed is:

1. A system for pasturing animals comprising;
an elongated coop having connected vertical walls and a roof as well as an open floor therebelow with the coop being moveable in a first direction upon wheels or skids;
a silo for collecting grain or feed;
and an elongated conveyor or auger extending in a direction parallel to the first direction, with the conveyor or auger providing a path for grain or feed from the silo to an internal feed distribution system within the coop
wherein there is a separate path configured to deliver water to the coop.

2. The pasturing system of claim 1, further comprising; a moveable fence coupled to the coop and moving therewith which defines an adjacent cattle grazing area.

3. The pasturing system of claim 1, wherein the conveyor or auger is operatively supported upon wheels or skids and is therefore movable.

4. The pasturing system of claim 1, wherein the conveyor or auger rotates about a central point on a field.

5. The pasturing system of claim 1, wherein the conveyor or augur travels in a linear direction generally parallel to the movement of the coop.

6. A system for pasturing animals comprising;
an elongated coop having connected vertical walls and a roof as well as an open floor therebelow with the coop being moveable in a first direction upon wheels or skids;
a silo for collecting grain or feed;
and an elongated conveyor or auger extending in a direction parallel to the first direction, with the conveyor or auger providing a path for grain or feed from the silo to an internal feed distribution system within the coop;
wherein at least one of the walls of the coop comprises compliant segments configured to accommodate irregularities in the elevation of the ground upon which the coop travels.

7. The pasturing system of claim 6, further comprising; a moveable fence coupled to the coop and moving therewith which defines an adjacent cattle grazing area.

8. The pasturing system of claim 6, wherein the conveyor or auger is operatively supported upon wheels or skids and is therefore movable.

9. The pasturing system of claim 6, wherein the conveyor or auger rotates about a central point on a field.

10. The pasturing system of claim 6, wherein the conveyor or augur travels in a linear direction generally parallel to the movement of the coop.

* * * * *